US006135095A

United States Patent [19]

Motose et al.

[11] Patent Number: 6,135,095

[45] Date of Patent: Oct. 24, 2000

[54] ENGINE CONTROL

[75] Inventors: Hitoshi Motose; Masahiko Kato, both of Hamamatsu, Japan

[73] Assignee: Sanshin Kogyo Kabushiki Kaisha, Hamamatsu, Japan

[21] Appl. No.: 09/200,635

[22] Filed: Nov. 30, 1998

[30] Foreign Application Priority Data

Nov. 28, 1997 [JP] Japan .................................... 9-341873

[51] Int. Cl.[7] .................................................. F02D 7/00

[52] U.S. Cl. ............................................ 123/481; 123/472

[58] Field of Search .................................... 123/481, 472, 123/473

[56] References Cited

U.S. PATENT DOCUMENTS

| | | | |
|---|---|---|---|
| 5,503,129 | 4/1996 | Robichaux et al. | 123/481 |
| 5,522,370 | 6/1996 | Katoh et al. | 123/481 |
| 5,992,374 | 11/1999 | Morikawa | 123/481 |

*Primary Examiner*—John Kwon

*Attorney, Agent, or Firm*—Knobbe, Martens, Olson & Bear LLP

[57] ABSTRACT

A fuel injection control strategy and system for engines for maintaining good performance under normal running conditions and also for providing cylinder engine speed slowdown under abnormal conditions by cylinder skipping. Transitional operation between these modes is improved by changing injection timing and/or injection duration of the operating cylinders during this time. Adjustment in spark timing may also be incorporated along with this routine.

12 Claims, 9 Drawing Sheets

*Figure* 5

ENGINE CONTROL

BACKGROUND OF THE INVENTION

This invention relates to a two cycle engine and more particularly to a direct cylinder injection method and control strategy for such engine.

It is well known that the simplicity of two cycle engines and their ability to produce greater power output for a given displacement than four cycle engines presents a number of advantages, particularly in certain types of applications. However, the exhaust emission control situation with two cycle engines has placed pressure on many manufacturers to convert to four cycle engines for applications normally enjoyed by two cycle engines.

One area where two cycle engines are widely used is in conjunction with outboard motors. With an outboard motor, the engine is, however, required to run over a wide variety of speed and load ranges. For example, it is not untypical for an outboard motor to be operated either at full throttle, full power or in a trolling condition. In this latter condition, the engine actually runs at lower than idle speed. This is a particularly difficult area for two cycle engines to operate in efficiently, particularly when they are designed to produce high power outputs at full throttle.

In order to maintain the desired idle speed and fuel economy and for other reasons, it has been the practice to operate two cycle engines under some conditions with a so-called cylinder skipping method. This methodology is particularly employed when there is some difficulty with the engine or other malfunction that requires the operator to be able to be able to reach port safely, but still protect the engine from damage.

In this limp hold mode, cylinder disabling is frequently employed. This is done by skipping the firing of the cylinders for one or more revolutions. The number of cylinders skipped also varies depending upon the engine speed control that is desired.

The conditions when cylinder skipping is employed may be when shifting the transmission, when there is a danger of decrease in oil availability or when the engine is operating at a high temperature or high speed.

When the cylinder skipping is employed, fuel continues to be supplied to the engine. This is done because of the difficulty in transitioning the operation from skipping mode back to full cylinder operation mode. This is particularly necessary where the charge is delivered to the engine through the crankcase chamber and scavenge arrangement. It takes some time for the fuel charge to reach the combustion chamber and thus it may be necessary to supply fuel even when the cylinder is not being operated. This obviously adds to the emission problems.

There has been proposed, therefore, a system for direct cylinder injection in two cycle engines. However, the injection timing employed with conventional direct injected two cycle engines also can present some emission and smooth running problems. Therefore, a system has been proposed by us that is described in the co-pending application entitled, "Control for Direct Injected Two Cycle Engine", Ser. No. 09/188953, Filed Nov. 10, 1998 and assigned to the Assignee hereof, where the injection initiation and duration is controlled so as to minimize the likelihood of fuel escaping from the exhaust port while still obtaining maximum power output. In accordance with that arrangement, the initial fuel injection is begun at a point when the exhaust port is still open but at a time wherein the fuel injected will not reach the exhaust port during the time when the exhaust port is still open. Basically, injection is done while the exhaust port is open rather than delaying it until after it closes as with more conventional methodologies.

It is an object of this invention to take advantage of that methodology and to also enable the engine to operate with speed control that may require cylinder skipping, but which will reduce the likelihood of the exhaust gases containing unburned hydrocarbons.

It is a further object of this invention to provide a direct cylinder injected two cycle engine having a control arrangement wherein engine speed reduction is obtained with cylinder skipping but which improves transition to that mode and also back to normal running and also to avoid the discharge of hydrocarbons to the atmosphere.

It is a further object of this invention to provide an improved method and construction for providing reduced engine speeds in direct injection two cycle engines under some running conditions without adversely affecting engine emission control or transitioning to that condition and transition from that condition back to normal running.

SUMMARY OF THE INVENTION

This invention is adapted to be embodied in a two cycle crankcase compression, direct cylinder injected internal combustion engine. The engine is comprised of an engine body defining at least one cylinder bore in which a piston reciprocates. A cylinder head is affixed to one end of the engine body for closing the cylinder bore and defining with the piston and the cylinder bore a combustion chamber. A crankcase chamber is formed at the other end of the cylinder bore. At least one scavenge port interconnects the crankcase chamber with the combustion chamber and is opened and closed by the reciprocation of the piston in the cylinder bore for admitting an air charge to the combustion chamber. At least one exhaust port is formed in the cylinder bore for discharging burned combustion products from the combustion chamber. The exhaust port, like the scavenge port, is opened and closed by the reciprocation of the piston in the cylinder bore. A fuel injector is positioned in the engine body and sprays fuel directly into the combustion chamber for combustion therein. In response to certain conditions, engine speed is reduced by skipping the injection of fuel to one or more cylinders.

In accordance with a method for practicing the invention, the fuel is normally injected at a time so as to complete injection before the exhaust port is closed. However, under transitional periods where engine speed is being reduced by effecting cylinder skipping by ceasing the injection of fuel to one or more cylinders in order to reduce engine speed or when increasing the speed after such a mode, transitional running is improved by injection timing is retarded and/or injection duration is shortened from the normal conditions.

In an engine control system embodying the invention, the fuel injection timing and duration is controlled under normal engine running so as to be completed before the exhaust port closes. However, under transitional periods where engine speed is being reduced by effecting cylinder skipping by ceasing the injection of fuel to one or more cylinders in order to reduce engine speed or when increasing the speed after such a mode, transitional running is improved by injection timing is retarded and/or injection duration is shortened from the normal conditions.

As a further feature, the change in cylinder operation is done by effecting the operation of specific cylinders in the firing order after the change is desired to make the transition smoother.

DETAILED DESCRIPTION OF THE PREFERRED EMBODIMENTS OF THE INVENTION

Figure 1:
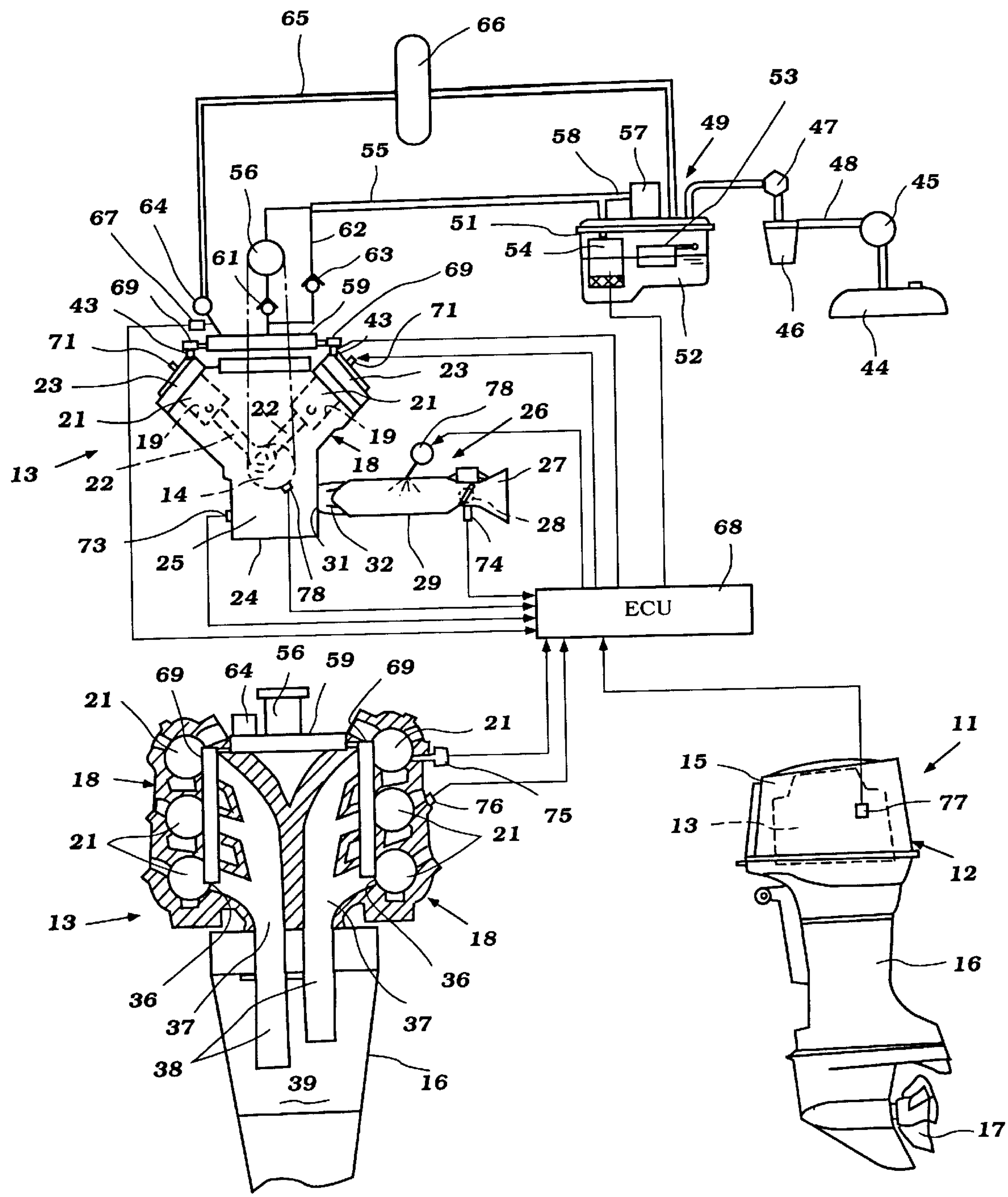
FIG. 1 is a partially schematic view having three portions that are connected by the controlling ECU of the engine. The lower right hand portion of this view shows a partial side elevational view of an outboard motor, the lower left hand side shows a rear elevational view of the outboard motor on an enlarged scale and a partial cross-section of the engine taken through the cylinders and exhaust manifold and the upper portion shows a top plan view of the engine and the fuel supply system with portions shown schematically.

Referring initially primarily to FIG. 1, the lower left hand portion of this view illustrates a side elevational view of an outboard motor that is constructed and operated in accordance with the invention. The outboard motor is indicated generally by the reference numeral 11 and except as will hereinafter be noted maybe considered to be of a generally conventional construction.

The outboard motor 11 is comprised of a power head 12 that contains a powering internal combustion engine 13. As best seen in the other two portions of this figure, the engine 13 is, in the illustrated embodiment, of the V6 type and operates on a two stroke crankcase compression principal. Although the number of cylinders and cylinder orientation can be varied, the invention has particularly utility in connection with two cycle engines and particularly those having multiple cylinders.

As is typical with outboard motor practice, the engine 13 is supported in the power head 12 so that its crankshaft 14 rotates about a vertically extending axis for a reason which will be described momentarily.

The power head 12 is completed by a protective cowling 15 which surrounds and protects the engine 13. This protective cowling 15 is formed with an air inlet opening so that induction air for operation for the engine 13 can be drawn from the surrounding atmosphere.

The engine 13 and specifically its crankshaft 14 is coupled to a driveshaft (not shown) that depends into and is journaled within a driveshaft housing lower unit assembly 16. This is the reason for the vertical orientation of the axis of rotation of the crankshaft 14. This driveshaft depends into the lower unit where it drives a propulsion device for an associated watercraft through a suitable transmission. In the illustrated embodiment, the propulsion device comprises a propeller 17 which is selectively driven in forward and reversed directions through a bevel gear reversing transmission of the type well known in this art.

The outboard motor 11 also includes clamping and swivel brackets or another arrangement for mounting it to the transom of an associated watercraft. Since these types of constructions are well known in the art, further description of them is not believed to be necessary to permit those skilled in the art to practice the invention.

Referring now primarily to the lower left hand view and the upper view, the engine 13 includes a cylinder block, indicated generally by the reference numeral 18. Because of the V-type configuration employed in the illustrated embodiment, the cylinder block 18 is formed with two cylinder banks each of which has three vertically spaced cylinder bores 19. Pistons 21 are slidably supported in the cylinder bores 19. The pistons 21 are connected by means of connecting rods 22 to the throws of the crankshaft 14 for driving it in a known manner.

Cylinder head assemblies, indicated generally by the reference numeral 23 are affixed to the banks of the cylinder block 18 and close the cylinder bores 21. These cylinder head assemblies 22, the cylinder bores 19 and the pistons 21 form the combustion chambers of the engine 13.

The crankshaft 14 rotates in a crankcase chamber defined by the cylinder block 18 and a crankcase member 24 that is affixed thereto. As is typical with two cycle crankcase compression engines, the portions of the crankcase chamber, indicated schematically at 25, associated with each of the cylinder bores 19 are sealed from each other.

An air charge is delivered to these individual crankcase chamber sections 25 by an air induction system which appears also in the upper portion of this figure and which is indicated generally by the reference numeral 26. This induction system 26 includes an air inlet device 27 that may include a silencing arrangement and which draws air from within the protective cowling 15 that has been admitted through the aforenoted inlet opening.

A throttle valve 28 is provided in throttle bodies that communicate with the intake device 27 and deliver it to intake manifold runners 29 of an intake manifold assembly. The throttle valves 28 are controlled in any suitable manner to satisfy the operator demand. The intake manifold runners 29 communicate with intake ports 31 formed in the crankcase member 24 and each associated with a respective cylinder bore 19.

Reed type check valves 32 are provided in the manifold runners 29 adjacent the intake ports 31. These reed type check valves permit an air charge to be drawn into the crankcase chambers when the respective pistons 21 are moving upwardly in their cylinder bores 19. As the pistons 21 move downwardly, the charge in the crankcase chambers 25 will be compressed and the respective reed type check valve 32 will close to preclude reverse flow.

Figure 2:
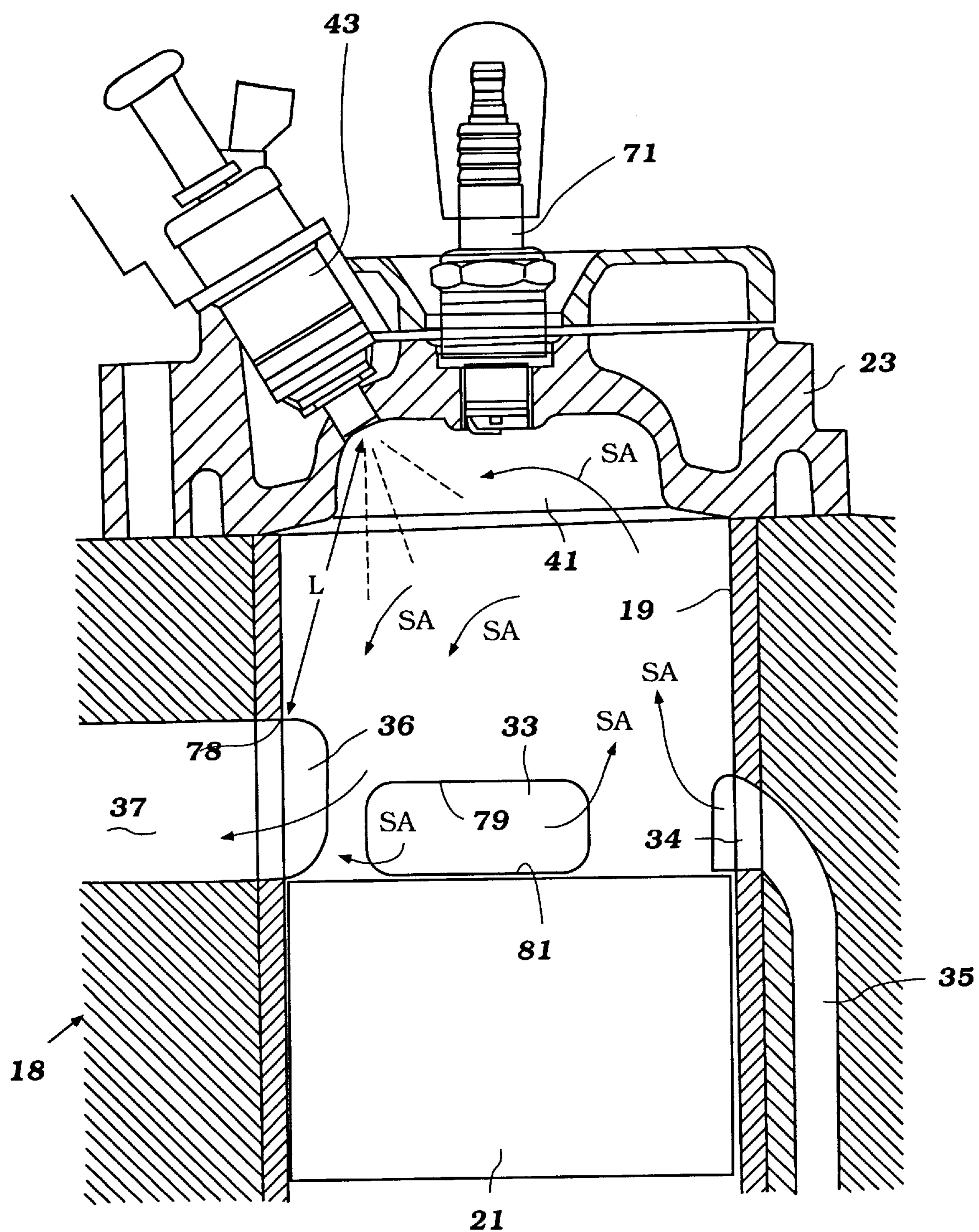
FIG. 2 is an enlarged cross-sectional view taken through a single cylinder of the engine and depicts part of the theory by which the control strategy operates.
Figure 3:
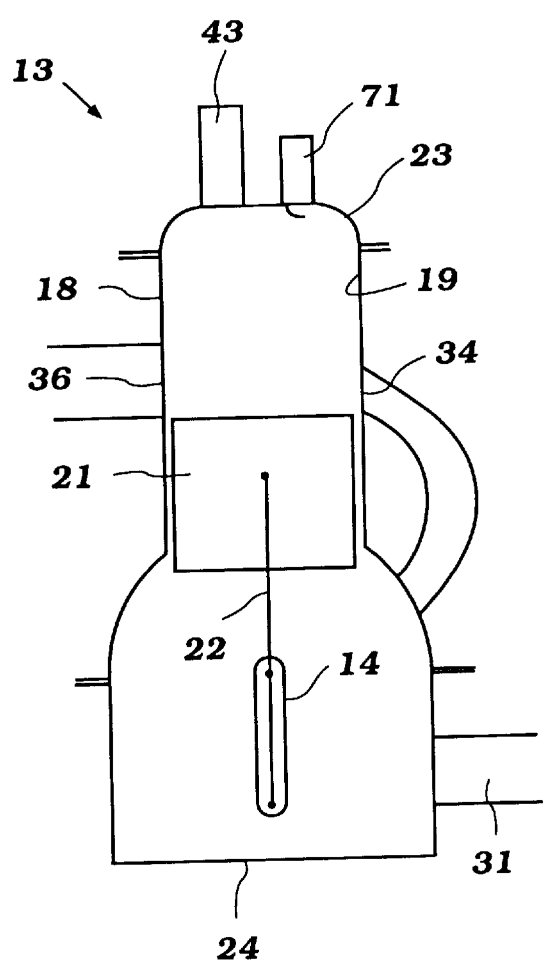
FIG. 3 is a partially schematic view taken generally in the same direction as the upper portion of FIG. 1 but only of a single cylinder and shows the piston at its bottom dead center position.
Figure 4:
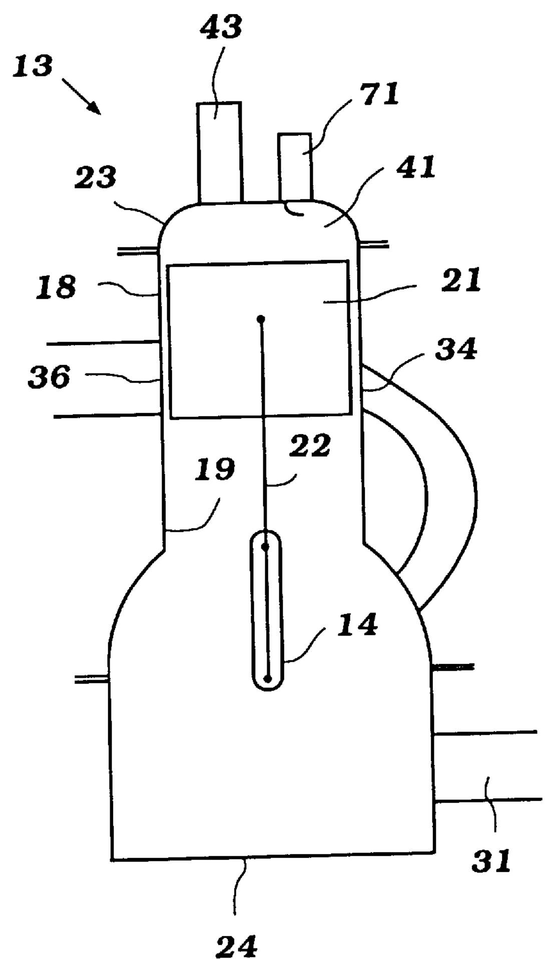
FIG. 4 is a view, in part similar to FIG. 3 and shows the piston at its top dead center position.

Referring now additionally to FIGS. 2–4, it will be seen that each cylinder bore is provided with a scavenging system. In the illustrated embodiment, the scavenging system is of the Schnurl type and includes a pair of side, main scavenge ports 33 and a center, auxiliary scavenge port 34. Scavenge passages 35 communicate the crankcase chambers 25 with each of the scavenge ports 34 and 35. As is well known in two cycle practice, the scavenge ports 33 and 34 are opened and closed by the reciprocation of the pistons 21 in the cylinder bores 19.

It should be noted that the main scavenge ports 33 are disposed on opposite sides of an exhaust port 36 which is diametrically opposite the auxiliary scavenge port 34. As may be best seen in the lower left hand portion of FIG. 1, the exhaust ports 36 communicate with exhaust manifolds 37 that are formed integrally within the cylinder block 18. Basically, there is an exhaust manifold 37 for each bank of cylinders.

These exhaust manifolds 37 terminate in exhaust pipes 38 that depend into an expansion chamber 39 formed in the driveshaft housing and lower unit 16. This expansion chamber 39 communicates with a suitable high speed underwater exhaust gas discharge and a low speed above-the-water exhaust gas discharge of any known type. The particular type of exhaust system employed does not form any part of the invention although the invention does have utility in connection with engines having multiple cylinders and arrangements wherein a plurality of exhaust ports of those cylinders communicate with a common exhaust manifold.

As the pistons 21 move downwardly in their cylinder bores 19 toward the bottom dead center position shown in FIG. 3, the charge compressed in the crankcase chambers 25 will be compressed and eventually transfer to the respective engine combustion chamber, indicated generally by the reference numeral 41 through the scavenge passages 35 and scavenge ports 33 and 34 when they are opened by the movement of the piston 21. The flow of scavenging air is shown in FIG. 2 by the arrows SA.

In accordance with an important feature of the invention, the engine 13 is provided with a direct cylinder fuel injection system. This fuel injection system is shown in parts schematically in the upper portion of FIG. 1 and will now be described by particular reference to that figure. Before referring thereto, however, it should be noted that fuel injectors 42 are mounted in the cylinder head assembly 23 so as to spray fuel from this fuel supply system directly into the combustion chambers 41. The location and functioning of these fuel injectors 43 will be described after the system which supplies fuel to them has been described.

As is typical with outboard motor practice, the outboard motor 11 is supplied with fuel from a main fuel tank 44 which is normally mounted within the hull of the associated watercraft. Fuel is supplied form this tank 44 by a first low pressure pump 45 to a fuel filter 46 that is mounted within the protective cowling 12. The connection from the fuel tank 44 to the filter 46 includes a conduit 47 having a quick disconnect coupling of a known type.

A second, engine driven low pressure fuel pump 47 in the power head 12 collects the fuel from the fuel filter 46 and delivers it to a vapor separator, indicated generally by the reference numeral 49. The low pressure fuel pumps 48 may be of the type that are operated by crankcase pressure variations as is well known in this art.

The vapor separator 49 includes an outer housing 51 that is mounted at a suitable location within the protective cowling 15. A level of fuel, indicated at 52 is maintained in this housing 51 by a valve operated by a float 53.

Contained within the housing 51 is an electrically driven pressure pump 54 which develops a higher pressure than the pump 47 but a pressure that is not really high enough for effective high pressure direct cylinder injection.

This fuel is discharged from the vapor separator housing 51 through a supply conduit 55 to a high pressure, engine driven, positive displacement pump 56. The pump 56 may be of any known type and preferably has one or more plungers operated by cams for delivering extremely high pressures at a positive displacement. The pressure at which fuel is delivered to the high pressure pump 56 is regulated by a low pressure regulator 57 in a return line 58 that communicates the pressure line 55 back with the interior of the vapor separator body 51.

The high pressure pump 56 delivers fuel under pressure to a main fuel manifold 59 through a conduit in which a check valve 61 is positioned. A parallel conduit 62 extends around the high pressure pump 56 to the main fuel manifold. A check valve 63 is provided in this bypass line so that when the high pressure pump 56 is generating high pressure fluid, no flow will occur through the line 62.

A high pressure regulator 64 is provided in the main fuel manifold 59 and limits the maximum pressure of the fuel supply to the fuel injectors 43. This is done by dumping fuel back to the vapor separator assembly 49 through a return line 65. A fuel heat exchanger or cooler 66 may be provided in this return line 65 so as to ensure that the fuel is not at too high a temperature.

A pressure sensing device 67 is provided also in the main fuel manifold 59 for providing a fuel pressure signal to an ECU, indicated at 68 in FIG. 1 for controlling the engine systems, as will be described.

The main fuel manifold 59 supplies fuel to a pair of fuel rails 69 each of which is associated with a respective one of the cylinder banks. The fuel rails 69 each supply fuel in a known manner to the fuel injectors 43 of the respective cylinder banks.

As seen in FIG. 2, the fuel injectors 43 are mounted in the cylinder head assemblies 23, in the illustrated embodiment, over the exhaust ports 36 on the exhaust side of the engine. These injectors spray downwardly toward the heads of the pistons 21. The fuel injectors 43 are preferably of the solenoid operated type and have a solenoid valve which, when opened, controls the discharge of fuel into the combustion chambers as shown in broken lines in FIG. 2 and in a pattern as shown by the phantom line view of FIG. 3 so as to provide a fuel patch in the combustion chamber, the size of which depends upon the duration of fuel injection as will become apparent.

Spark plugs 71 are mounted in the cylinder head assemblies 23 and have their spark gaps disposed substantially on the axis of the cylinder bores 19. These spark plugs 71 are fired by an ignition circuit under the control of the ECU 68.

The ECU 68 controls the timing of firing of the spark plugs 71 and the beginning and duration of fuel injection by the injector 69. To this end, there is provided a number of sensors which sense either engine running conditions, ambient conditions or conditions of the outboard motor 11 that will effect engine performance. Certain of the sensors are shown schematically in FIG. 1 and will be described by reference to that figure. It should be readily apparent to those skilled in the art, however, that other types of sensing and control arrangements may be provided operating within the general parameters which will be set forth later having to do with the timing of initiation of fuel injection.

A crank angle sensor 72 is associated with the crankshaft 14. This sensor 72 provides not only a signal of crank angle but by comparing that signal with time an indication of crankshaft rotational speed.

There is also provided a crankcase pressure sensor 73 which senses the pressure in one or all of the crankcase chambers 25. By measuring crankcase pressure at a particular crank angle, engine air induction amount can be determined.

Engine or operator demand is determined by a throttle position sensor 74 that operates in conjunction with a throttle valve 28 so as to determine this function.

The ECU 68 may operate on a feedback control condition and thus, an air fuel ratio sensor 75 is provided that communicates with the combustion chambers or exhaust port of at least one of the cylinder. Preferably, an oxygen sensor is utilized for this purpose, although other types of devices may be employed.

Engine temperature is sensed by a engine temperature sensor 76.

The temperature of the cooling water drawn from the body of water in which the watercraft or outboard motor 11 is operated is measured by a water temperature sensor 77. As has been noted, those sensors described may be just typical of any of the wide variety of sensors utilized for engine control.

In addition to controlling timing of firing of the spark plugs 71 and initiation and duration of fuel injection by the fuel injectors 43, the ECU 68 may also control a lubricating system. This is comprised of an oil supply system including a pump 78 that sprays oil into the intake passages 29 for engine lubrication. In addition, some forms of direct lubrication may be also employed for delivering lubricant directly to certain components of the engine.

The system as thus far described may be considered to be conventional and for that reason, where any component has not been illustrated or described in detail, reference may be had to conventional or known structures with which to practice the invention. The timing of beginning of fuel injection, particularly under low speed and low load conditions is basically determined as set forth in our aforenoted co-pending application. This strategy may be understood by first referring to the timing diagram shown in FIG. 5.

Figure 5:
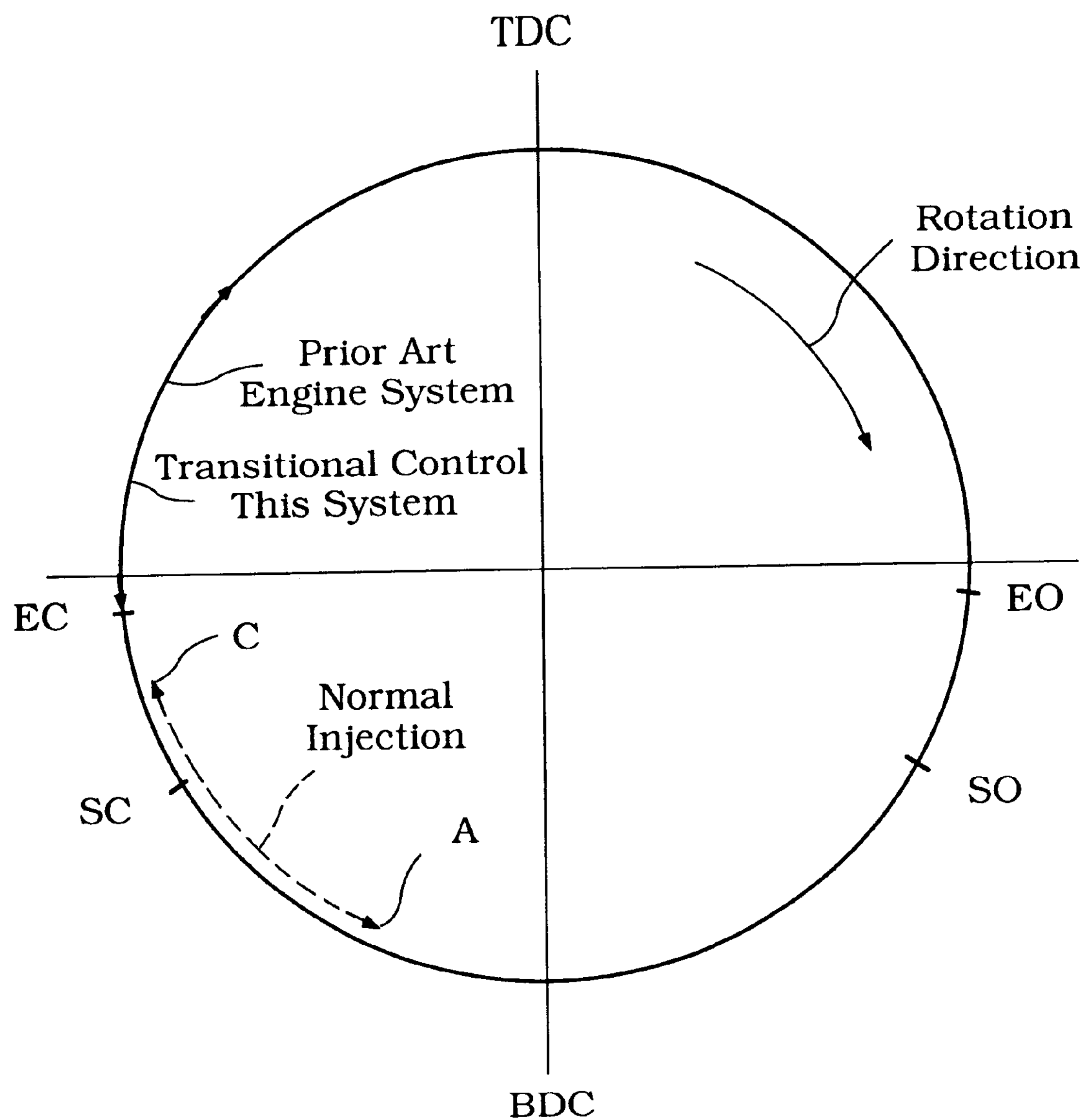
FIG. 5 is a timing diagram showing the fuel injection strategy in relation to crank angle in accordance with the basic control routine of the invention.

The direction of crankshaft rotation is indicated by the arrow R and the piston top dead center position, as shown in FIG. 4, is indicated at TDC in FIG. 5. Bottom dead center position (FIG. 3) is indicated in FIG. 5 as BDC. This figure also shows the timing of opening of the scavenge and exhaust ports and their respective closing. The opening of the exhaust ports 36 occurs when the piston passes the upper edge 78 (FIG. 2) of the exhaust port 36. This point is indicated as EO in FIG. 5.

As the pistons 21 continue their downward movement eventually the scavenge ports will open when their upper edges 79 are opened by the downward movement of the pistons 21. This point appears in FIG. 5 as SO.

The scavenging operation continues when the piston 21 passes bottom dead center and begins to move upwardly to begin to close the scavenge ports 33 and 34 by passing their lower edges 81. Full closure of the scavenge ports occurs at the point SC in FIG. 5 when the piston again passes the upper edge 79 of the scavenge ports 33 and 34. Finally, the exhaust ports 36 are closed when the pistons 21 pass their upper edges 78 at the point EC.

With conventional engine injection strategies, the fuel injection is begun generally almost immediately after the exhaust ports 36 are closed with the duration being determined by the load on the engine. Thus, the conventional practice is to cause the injection to happen late in the cycle before the piston reaches top dead center and immediately before firing. As more fuel is required, the injection duration is extended. However, this may cause the fuel to travel to the exhaust port before combustion has been completed and when the exhaust port again opens some unburned fuel may escape.

Also the velocity of air flow in the combustion chamber at this time is relatively low and there will be poor mixing of fuel with the air. The low air velocity also results in poor flame propagation and poor and/or incomplete combustion results.

In accordance with the invention as set forth in our aforenoted co-pending application, the injection timing is initiated before a point where the injected fuel path toward the exhaust port 36 and specifically its upper edge 78 along a dimension indicated at L in FIG. 2 and considering the air flow within the combustion chamber will not reach the exhaust port before it has fully closed. This time is referred as the "fuel reachable time or angle of crank rotation". This fuel reachable time Tf in seconds is the time period for arrival of the fuel to the exhaust port and is determined by dividing the distance L by the speed of fuel as injected Vf.

$$Tf=L/Vf$$

Assuming the engine speed is in rpm, the fuel reachable angle, Kf, which the crankshaft rotates within the fuel reachable time, Tf, is obtained by multiplying Tf by engine speed, n, by 360° and divided by 60.

$$Kf=(Tf\times n\times 360)/60$$

As a specific example, if the engine is running in a condition wherein the fuel reachable angle Kf will be 60° if the fuel reachable timing is 2.5 milliseconds and the engine speed is 4000 rpm.

Thus, in accordance with our earlier invention, the fuel injection is initiated at a time A after bottom dead center and before exhaust port closing and continuing to the point C which is a point again before the exhaust port closes. Thus, to further ensure that fuel will not pass out of the exhaust port before it closes, the beginning of fuel injection at the point A or the actual fuel reachable angle Kf is compensated by an amount $\alpha$ which is in the direction opposite to the direction of crankshaft rotation. In other words, the time of beginning of injection is advanced.

By doing this, it is possible to obtain better mixing of the fuel and air thus making a substantial reduced reduction in the amount of hydrocarbon emissions by improving combustion and combustion efficiency. Also, by advancing the timing of injection start from that conventionally employed, the airflow velocity within the cylinder is higher and, therefore, fuel mixing is further improved.

The total normal running strategy is set forth in our earlier application and since it is not necessary to understand the operation of this invention, it will not be repeated here.

The system as thus far described may be considered to be conventional, except for the injection control strategy described in our aforenoted co-pending application, and for that reason, where any component has not been illustrated or described in detail, reference may be had to conventional or known structures with which to practice the invention. The system also includes a normal running injection and ignition control system as described in our aforenoted co-pending application.

This type of normal injection control is employed under all running conditions except under conditions where it may be desirable to slow the engine to protect against damage under certain malfunctions while still maintaining a limp home mode. Under some abnormal running conditions, it may be desirable or necessary to reduce the engine speed by some method so as to permit the operator to be able to return to port safely, but to protect the engine or components from damage. These conditions may arise under a number of circumstances, for example, if engine speed slowing is required to assist in making a shift, if the lubricant level is low for the engine, if the engine speed is abnormally high and/or if the engine temperature is high. With conventional systems, this has been done by skipping the firing of certain cylinders. In some instances, fuel is continued to be supplied under these conditions and this can cause hydrocarbon emissions to result. However, the continued fuel supply is generally done to improve transitional mode operation.

If desired, the engine speed control may be obtained in the method set forth in our co-pending application entitled "Control for Direct Injected Two-Cycle Engine," Ser. No. 09/199,731, filed Nov. 25, 1998 and assigned to the assignee hereof. Even utilizing that methodology, however, there are some situations when cylinder skipping is desirable by discontinuing the injection of fuel. The invention in this application deals with either utilizing that method and obtaining improved transitional performance when going from cylinder skipping to cylinder running, or in conjunction with an arrangement wherein cylinder skipping is accomplished by discontinuing fuel injection to those cylinders to be skipped.

It is to be understood that the control strategy by which cylinder skipping is determined to occur can be of any type and the number of cylinders skipped can be varied depending upon any desired strategy as can the return to normal running.

In accordance with a feature of the invention, when there is a transition between normal all cylinder engine running and cylinder skipping or back from cylinder skipping to normal engine running, adjustments are made in the fuel injection initiation timing and/or duration and also in the ignition timing so as to provide a smoother transition that will be less noticeable to the operator and also which will reduce hydrocarbon emission.

Figure 6:
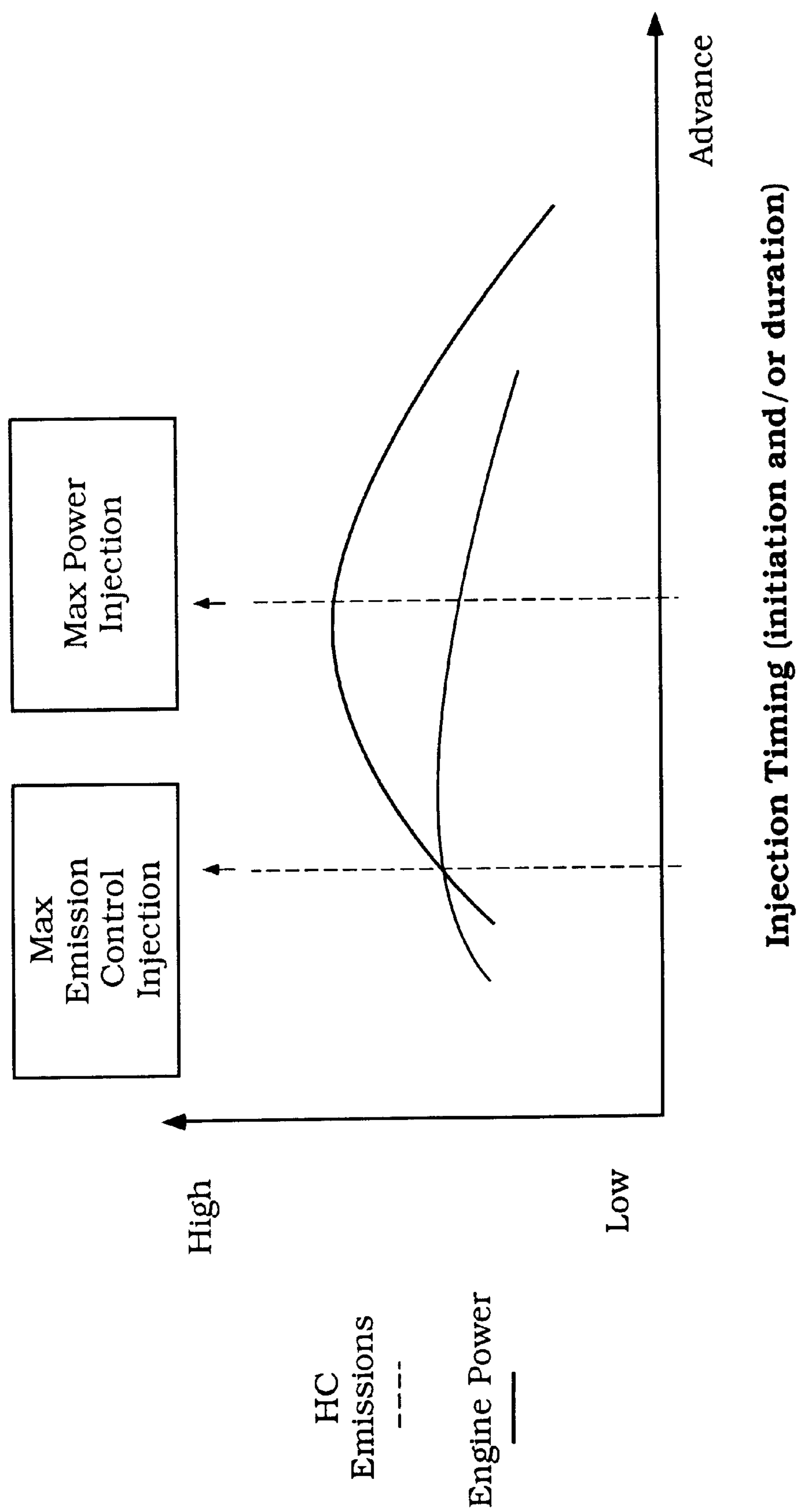
FIG. 6 is a graphical view showing the relationship of hydrocarbon emissions in the exhaust level and engine output in relation to injection initiation timing and/or duration and shows the different control areas where maximum power and maximum exhaust emission control occur to explain the control strategy further.

FIG. 6 is a graphical view showing hydrocarbon emissions and engine power output in broken and solid lines, respectively, in respect to injection initiation timing and/or reduction in injection duration. As may be seen, maximum power is obtained when injection timing and duration is advanced and extended while maximum emission control can be obtained when the injection timing is retarded and also when the duration amount is reduced.

In accordance with the invention, during the transition to or from cylinder skipping mode, the engine speed is changed by shifting between the maximum power condition and the maximum emission control condition, while at the same time changing the engine speed by changing the number of cylinders fired. This achieves the result of having a smooth transition without increased exhaust emissions.

Figure 7:
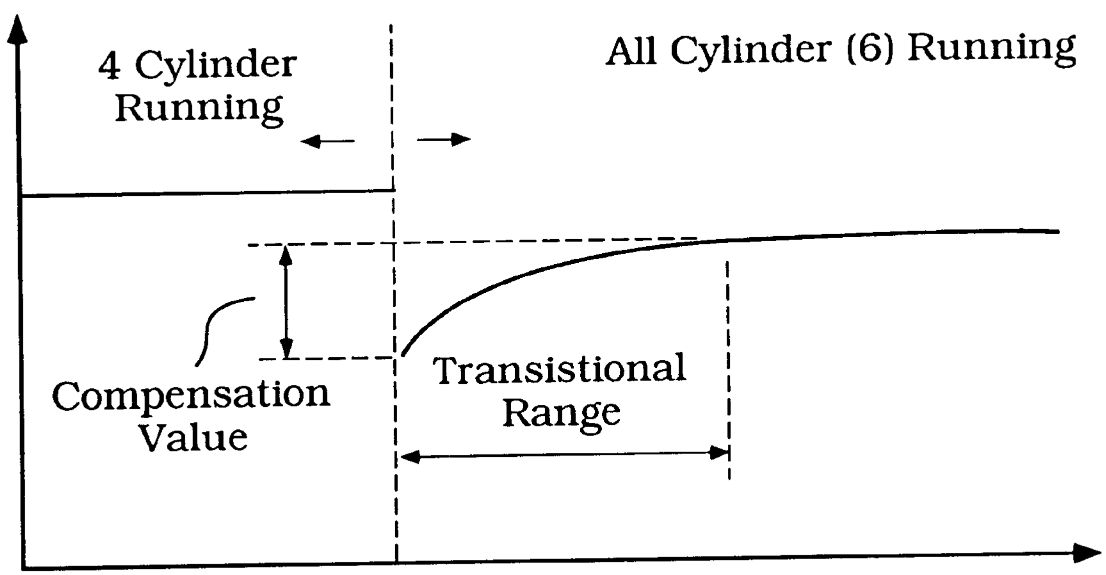
FIG. 7 is a graphical view showing the correction factors applied during the transitional stage of running in accordance with an embodiment of the invention.

This control strategy can be best understood by reference to FIG. 7 which shows a situation where the engine has been running with a cylinder skipping mold and then returned back to full cylinder operation. This figure shows a condition when four cylinders of the six cylinders are operating to maintain the desired speed. That is, the firing of two cylinders is skipped.

As is readily known in these types of control strategies, the skipping of the same two-cylinders is not always repeated. That is, the specific cylinders which are skipped may be changed during the running. By changing the cylinders that are not fired, it is possible to avoid fowling of the spark plugs and difficulties in returning back to full cylinder operation. Thus, when the discussion is made regarding shifting from one number of cylinders to another, it is to be understood that the same cylinders need not be skipped during the skipping mode. In fact the cylinder determination mode that will be discussed accommodates this.

As may be seen in this figure, when cylinder skipping occurs, the injection time is held for a fixed relatively longer than normal interval and the injection timing is advanced as under the normal type running condition as shown in FIG. 5. In other words, the four cylinders that are fired are fired in conjunction with a conventional type of injection timing and in accordance with the method described in our first aforementioned co-pending application. The fuel duration, however, is somewhat longer than if all cylinders were operating in order to maintain proper running.

At a time period when cylinder firing is going to be returned to all cylinder operation, there is a compensation in the amount of time duration of the injection and also the injection time duration may not be changed to the advanced mode instantaneously. There is therefore set a compensation value which is gradually built up over a relatively short time period during a transitional range to full cylinder operation.

During this time period, injection timing can be extended, start of injection timing can be gradually advanced to the normal for the given running condition and spark advance may also be adjusted accordingly. This will provide a smoother transition.

It also should be understood that when shifting to cylinder skipping, the same type of control routine can be followed. That is, the control routine follows the opposite path from that shown in FIG. 7 wherein all cylinders continue to be fired but the amount of fuel supplied and the advance in injection timing is retarded gradually until two cylinders are skipped. Then, the remaining cylinders have their injection and duration set as shown in the left-hand side of FIG. 7.

In addition to providing this type of control routine, the routine is also initiated at a certain timing with respect to the firing of the cylinders.

Figure 8:
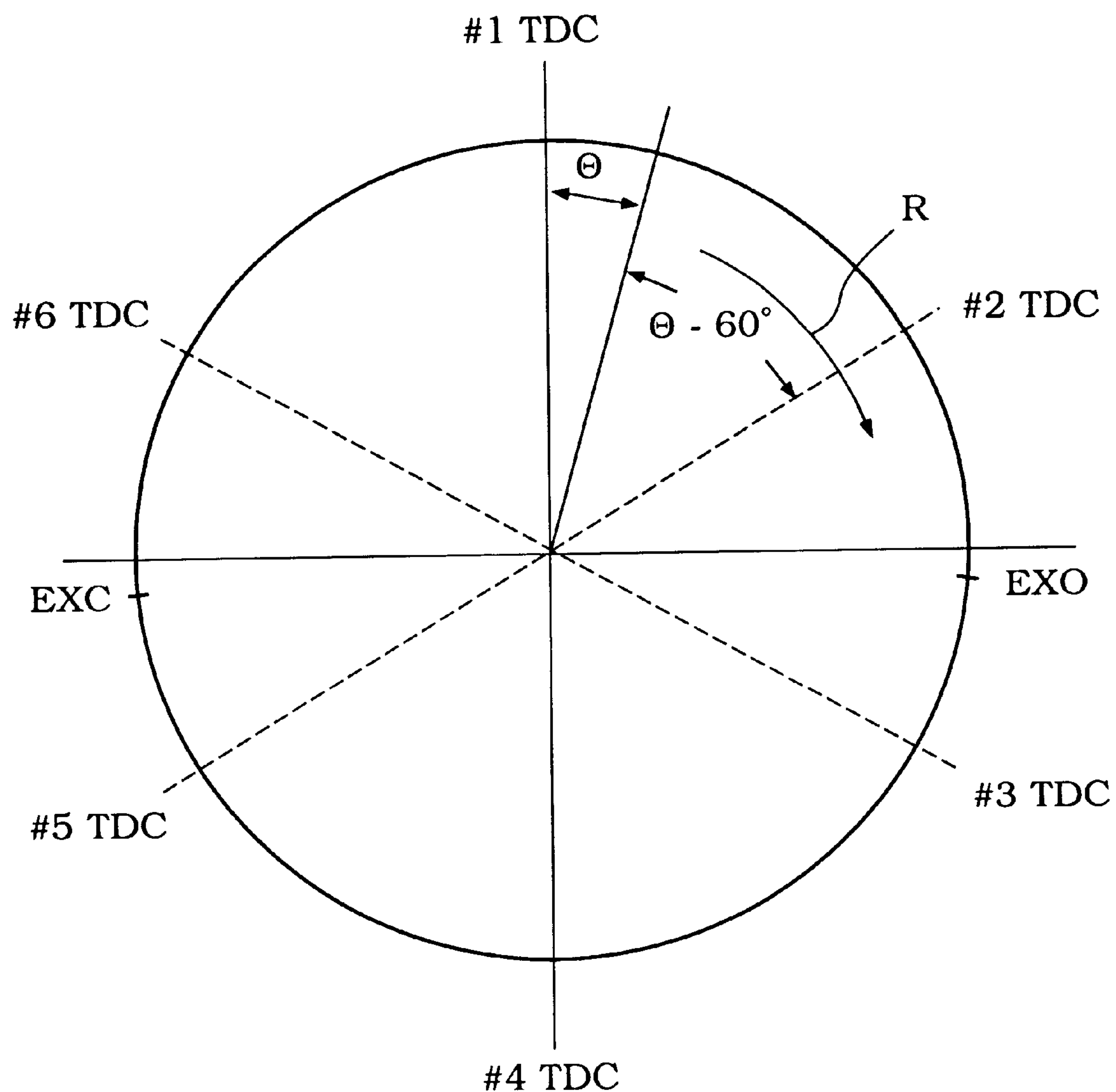
FIG. 8 is a timing diagram, in part similar to FIG. 5 but shows how the cylinder operation is selected during the transitional phase of running.

This may be understood best by reference to FIG. 8 which is a timing diagram showing how the cylinders fire relative to top dead center of a first cylinder. The firing order shown is 1, 2, 3, 4, 5, 6, although the principal can be applied with respect to a wide variety of firing orders. That is, the following description is exemplary but the actual system employed will be varied depending upon the actual firing order of the basic, normally operating engine.

In the timing diagram, the rotational direction is shown as R. At a predetermined time, indicated by the angle θ, it is determined that that transition either to cylinders skipping from normal running or returning to normal running from cylinder skipping should be accomplished. However, at that time, the program does not operate to immediately effect a change. Rather, the program waits for a time until the time for beginning of injection for the next cylinder to be fired has not yet been reached.

Then, the correction is made and that cylinder is fired. Subsequent cylinders are either started or disabled so that the number of working cylinders is either gradually increased or gradually decreased. If there is to be cylinder skipping, it will not start until after the next cylinder has been fired. In other words, the change in number of operating cylinders is not initiated immediately. However the next cylinder fired is corrected in injection timing and/or duration as explained previously by reference to FIG. 7. Also, if desired the ignition timing is also corrected.

Figure 9:
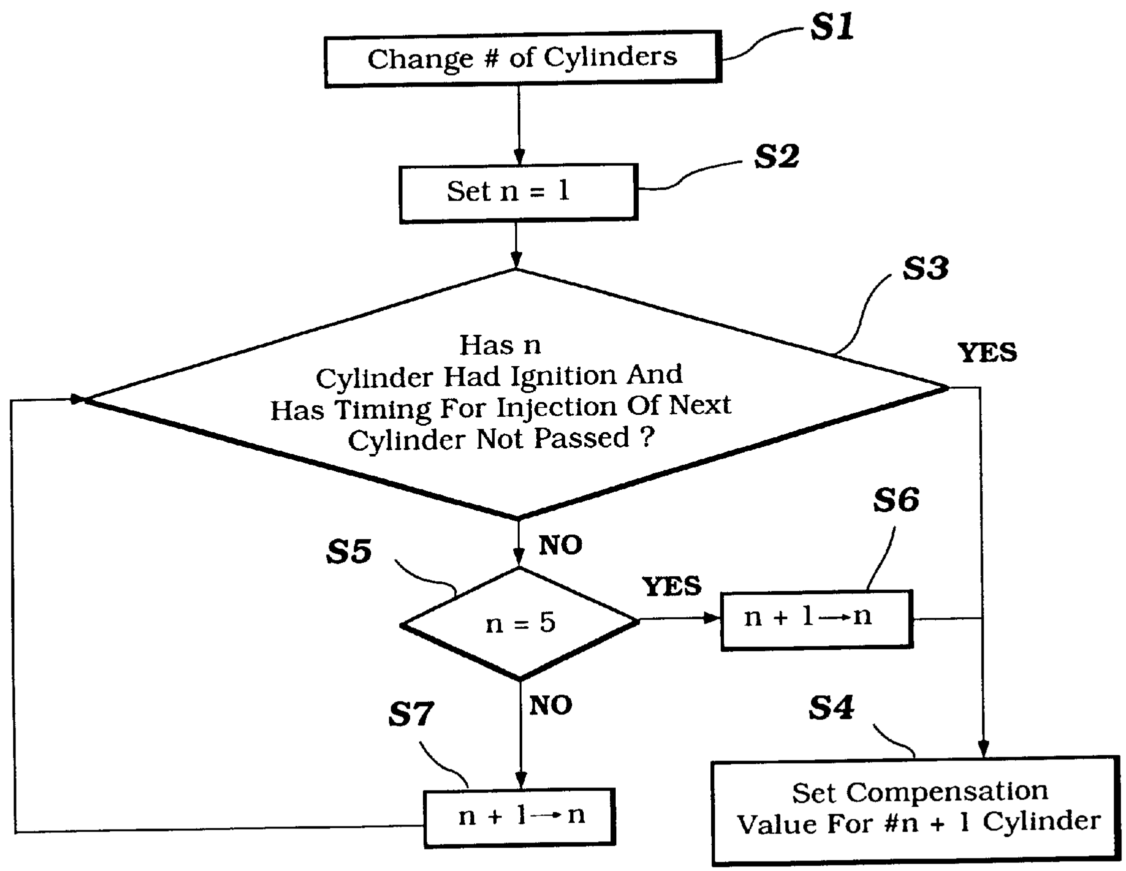
FIG. 9 is a block diagram of the general control routine employed in conjunction with the determination of cylinders to be affected and setting the compensation factor.

Thus, the general control routine is as appears in FIG. 9. If at the step S1 it is determined that the number of cylinders to be fired will be changed either by increasing or decreasing the number of cylinders the program then moves to the step S2 so as to set a counter to the number n=1.

The program then moves to the step S2 so as to determine if the ignition timing for the number n cylinder has passed and if the injection timing start for cylinder n+1 has not yet been reached. Thus, in the instance shown in FIG. 8, if the time θ is after the time of firing of number 1 cylinder which it clearly is and is before the timing for injection to start at for the number 2 cylinder then the program moves immediately to step S4 wherein the compensation value is set and the number n cylinder is determined as the first cylinder in the firing sequence at the compensated value.

If, however, at the step S3 it is determined that the cylinder n has not had its ignition or the timing for fuel injection of the next cylinder has not passed then the program moves to the step S5. At this step, it is determined if the number n cylinder is the fifth or next to last cylinder. If it is, the program moves to the step S6 so as to advance the cylinder number by 1 to 6 and the program moves to the step S4 so as to set the compensation value for the next cylinder and to set that as the number 1 cylinder.

If, however, at the step S5 it has been determined that the cylinder number is not cylinder 5, the program moves to the step S7 so as to reset the cylinder number by one, in other words, n=n+1 and the program repeats back to the step S3.

Figure 10:
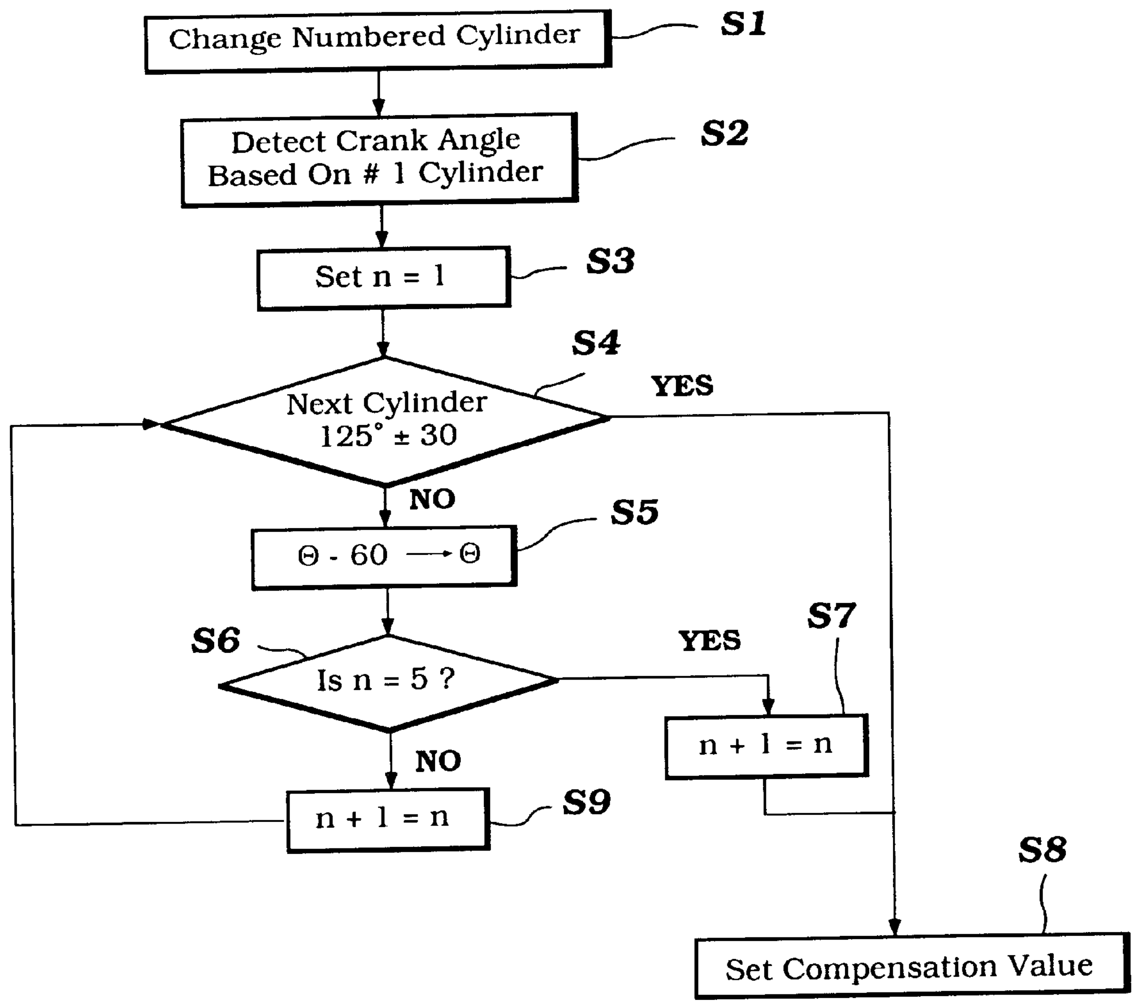
FIG. 10 is a block diagram of a specific control routine employed in conjunction with the selection of cylinders during the transitional mode.

The specific control routine by which this is accomplished may be understood by reference to FIG. 10. Again, the program starts at the step S1 by determining that the number of working cylinders is to be changed. The program then moves to the step S2 so as to detect the current crank angle based upon the degrees of rotation from top dead center of cylinder 1. Again referring to the specific examples illustrated in FIG. 8, this will be the crank angle θ which is something between the time of firing of top dead center of cylinders 1 and 2.

The program then moves to the step S3 to set the value n=1, the same as step S2 of the more general routine described in FIG. 9.

Then it is determined if the crank angle for the next cylinder is within the range of 95–155°. This is done so as to determine whether the cylinder which has been set as the number 1 cylinder is in fact the number 1 cylinder in the firing order. That is, since there is 60° of crankshaft rotation between cylinder firings, if the angle θ is greater than the range approaching 120°, it is known that the cylinder that has been set as number 1 in the counter is not the actual number 1 cylinder of the engine.

Assuming that the answer to the interrogatory in step S4 is negative, as it is in the given example, the program then moves to the step S5 so as to set a determination of the angle θ by subtracting it from 60° so as to determine the angle before top dead center of the next cylinder. This is done so as to determine that the time for the next cylinder is before the injection start timing.

The program then moves to the step S6 to determine if n is equal to 5. If it is, then the program moves ahead to the step S7 to add one unit to the counter to set the cylinder number to cylinder 6 and the program then moves to the step S8 so as to set the compensation value for the next cylinder to effect compensation to begin the compensation with cylinder 6.

If, however, at the step S6 it is determined that the value n is not equal to 5, then the program moves to the step S9 so as to add 1 to the counter and repeat back to step S4.

Thus, in accordance with the desired control routine immediately upon determining that the number of operating cylinders should be changed, the program does not effect this change until a time that is adequate after one cylinder has fired but before the next cylinder fuel injection time is to begin. This ensures that the injection timing will not be inappropriate and cause undue hydrocarbon emissions.

Subsequent cylinders will be either fired or skipped depending on the main control routine employed.

Thus, from the foregoing description, it should be readily apparent that the engine power and speed can be reduced while running is maintained while transitional performance is improved. The methods that describe arrangements for improving transitional running by correcting injection timing and/or injection duration. It is to be understood that these methods can be done either in conjunction with each other or in sequence with each other to obtain a desired control. Also, ignition timing can be adjusted to provide further compensation, if necessary. The control routine is not limited to two-cycle engines that can also be employed with four-cycle engines. Various other changes and modifications may be made without departing from the spirit and scope of the invention, as defined by the appended claims.

What is claimed is:

1. A two cycle, crankcase compression, direct cylinder injected internal combustion engine comprised of an engine body defining a plurality of cylinder bores, a piston reciprocating in each of said cylinder bores, a cylinder head affixed to one end of said engine body for closing said cylinder bores and defining with said pistons and said cylinder bores a plurality of combustion chamber, a crankcase chamber formed at the other end of said cylinder bores, a plurality of scavenge ports each interconnecting said crankcase chamber with a respective one of said combustion chambers and opened and closed by the reciprocation of the respective one of said pistons in the respective of said cylinder bores for admitting an air charge to said combustion chamber, a plurality of exhaust ports each formed in a respective one of said cylinder bores for discharging burned combustion products from said combustion chambers, said exhaust ports being opened and closed by the reciprocation of said pistons in said cylinder bores, a plurality of fuel injectors each spraying fuel directly into a respective one of said combustion chambers for combustion therein, means for sensing an abnormal condition, means for reducing engine speed in response to the sensing of said abnormal by skipping the injection of fuel to one or more cylinders, and means for controlling said engine during a transition between normal engine running and skipped injection running by effecting at least one of retarding injection timing and reducing injection amount from normal of an operating combustion chamber during said transition.

2. A two cycle, crankcase compression, direct cylinder injected internal combustion engine as set forth in claim 1, wherein the injection timing under normal running conditions begins while the exhaust port is open and terminates before the exhaust port closes.

3. A two cycle, crankcase compression, direct cylinder injected internal combustion engine as set forth in claim 2, wherein the injection timing under transition conditions begins after the exhaust port closes.

4. A two cycle, crankcase compression, direct cylinder injected internal combustion engine as set forth in claim 1, wherein the engine also has a plurality of spark plugs each for firing the charge in a respective of the combustion chambers and the spark timing is adjusted from normal under transitional conditions.

5. A two cycle, crankcase compression, direct cylinder injected internal combustion engine as set forth in claim 1, wherein the control during transition is not effected until after an operating cylinder in the firing order has fired and before the next fuel injector in the firing order has begun its injection.

6. A two cycle, crankcase compression, direct cylinder injected internal combustion engine as set forth in claim 5, wherein after the next fuel injector in the firing order has injected then other cylinders in the firing order are either enabled or skipped.

7. A method of operating a two cycle, crankcase compression, direct cylinder injected internal combustion engine comprised of an engine body defining a plurality of cylinder bores, a piston reciprocating in each of said cylinder bores, a cylinder head affixed to one end of said engine body for closing said cylinder bores and defining with said pistons and said cylinder bores a plurality of combustion chamber, a crankcase chamber formed at the other end of said cylinder bores, a plurality of scavenge ports each interconnecting said crankcase chamber with a respective one of said combustion chambers and opened and closed by the reciprocation of the respective one of said pistons in the respective of said cylinder bores for admitting an air charge to said combustion chamber, a plurality of exhaust ports each formed in a respective one of said cylinder bores for discharging burned combustion products from said combustion chambers, said exhaust ports being opened and closed by the reciprocation of said pistons in said cylinder bores, a plurality of fuel injectors each spraying fuel directly into a respective one of said combustion chambers for combustion therein, said method comprising the steps of sensing an abnormal condition, reducing engine speed in response to the sensing of said abnormal by skipping the injection of fuel to one or more cylinders, and controlling said engine during a transition between normal engine running and skipped injection running by effecting at least one of retarding injection timing and reducing injection amount from normal of an operating combustion chamber during said transition.

8. A method of operating a two cycle, crankcase compression, direct cylinder injected internal combustion engine as set forth in claim 7, wherein the injection timing under normal running conditions begins while the exhaust port is open and terminates before the exhaust port closes.

9. A method of operating a two cycle, crankcase compression, direct cylinder injected internal combustion engine as set forth in claim 8, wherein the injection timing under transition conditions begins after the exhaust port closes.

10. A method of operating a two cycle, crankcase compression, direct cylinder injected internal combustion engine as set forth in claim 7, wherein the engine also has a plurality of spark plugs each for firing the charge in a respective of the combustion chambers and the spark timing is adjusted from normal under transitional conditions.

11. A method of operating a two cycle, crankcase compression, direct cylinder injected internal combustion engine as set forth in claim 7, wherein the control during transition is not effected until after an operating cylinder in the firing order has fired and before the next fuel injector in the firing order has begun its injection.

12. A method of operating a two cycle, crankcase compression, direct cylinder injected internal combustion engine as set forth in claim 11, wherein after the next fuel injector in the firing order has injected then other cylinders in the firing order are either enabled or skipped.

* * * * *